March 19, 1957 W. D. KANALEY 2,785,420
DEVICE FOR INDICATING SUNKEN OBJECTS
Filed June 1, 1954
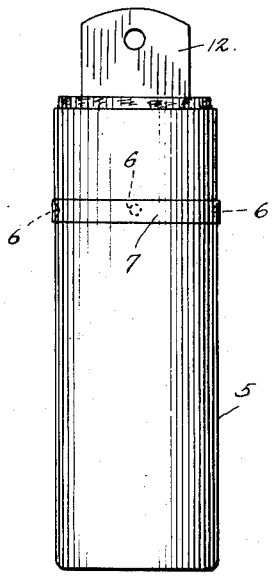
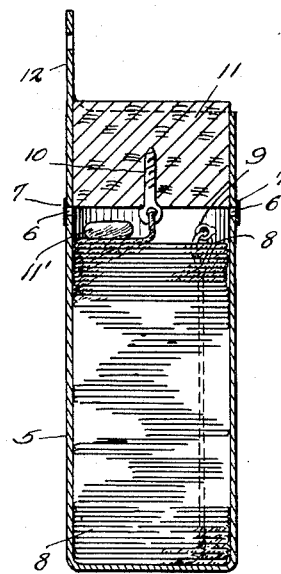
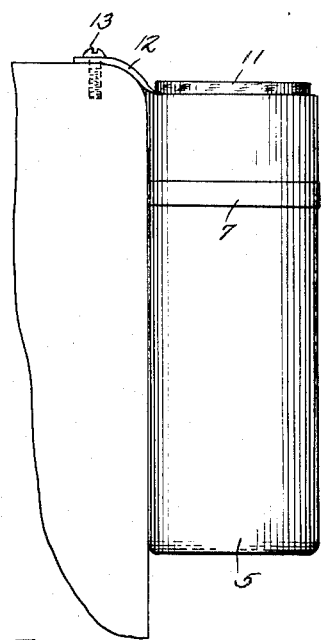
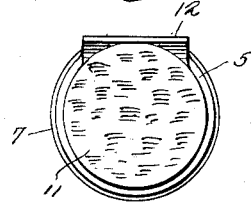
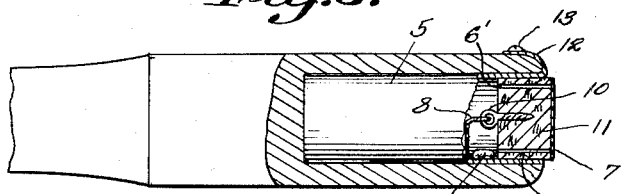
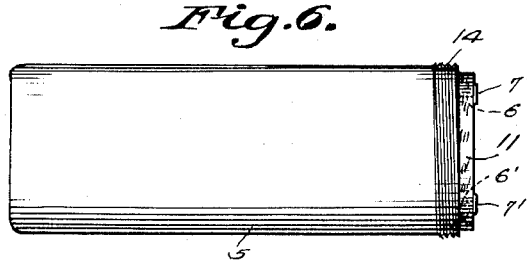
William D. Kanaley
INVENTOR

United States Patent Office 2,785,420
Patented Mar. 19, 1957

2,785,420
DEVICE FOR INDICATING SUNKEN OBJECTS

William D. Kanaley, North Sacramento, Calif., assignor of ten percent to Walter Koester, Sacramento, Calif.

Application June 1, 1954, Serial No. 433,592

1 Claim. (Cl. 9—9)

This invention relates to a device adapted to be secured to such devices as outboard motors, fishing rods, guns or the like which may be accidently dropped overboard, the device being so constructed and arranged that it will float to the surface of the water indicating the location of the article to which the indicator is attached, so that the article may be readily retrieved.

An important object of the invention is to provide an indicating device of this character embodying a container in which a line is normally held and a float connected to the line adapted to be automatically released when the container becomes submerged, the float providing a closure for the container, under normal conditions, and adapted to float to the water surface when released from the container.

Another important object of the invention is to provide an indicator of this character in which a metallic sodium or calcium carbide pellet or packet is held, the pellet dissolving, generating gas upon contact with water, with the result that the gas pressure within the container will displace the float which will float to the water surface indicating the location of the object which has become submerged, and to which the float is connected by an attaching line.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a front elevational view of a container supplied with an indicating float constructed in accordance with the invention.

Fig. 2 is a longitudinal sectional view through the container.

Fig. 3 is a side elevational view of the device shown as secured to an article.

Fig. 4 is a plan view of the container.

Fig. 5 is a fragmental view partly in section illustrating one end of a fishing rod with a device positioned in an opening thereof.

Fig. 6 is a side elevational view of a container supplied with threads for securing in a threaded opening.

Referring to the drawing in detail, the container which is indicated by the reference character 5, is shown in cylindrical form and provided with a line of openings 6 extending around the container at a point adjacent to the open end thereof.

These openings 6 are normally closed by a band 7 constructed of material which under normal conditions will protect the pellet placed within the container, against moisture. This band 7 is formed of material which will deteriorate or dissolve upon contact with water, thereby to admit water to the interior of the container, when the container is dropped overboard, the water dissolving the pellet to generate gas within the container.

Packed within the container is a thin strong nylon line or cord 8, which has one of its ends secured within the container by attaching the nylon cord to the eye-bolt 9, the opposite end of the nylon cord being secured to the screw-eye 10 that extends into the cork stopper 11. The gas forming pellet is shown in Fig. 2 of the drawing as resting between the nylon cord and the stopper, the pellet being indicated by the reference character 11'.

Extending from the open end of the container, is an ear 12 which is formed with an opening to permit the device to be readily secured to an article such as an outboard motor, gun, harpoon, fishing rod or the like, by means of a screw passed through such opening.

If desired to place the container against an object having a curved edge, such as shown by Fig. 3 of the drawing, the ear 12 may be bent over the curved edge of the object. As shown by Fig. 5 of the drawing the container is positioned in a socket or an opening formed in one end of the object with which it is used, and secured in place by means of the screw 13.

In Fig. 6 is shown a similar container, except in this form of the invention, threads 14 are provided at one end of the container 5 so that the container may be threaded in a threaded bore of an object, to secure the container in position.

From the foregoing it will be seen that due to the construction shown and described I have provided a container on which a length of fine but strong cord, such as nylon or the like, is connected within the container, with one end thereof connected to a float, which is disconnected from the container by the generation of gas within the container.

As the article to which the container is secured sinks to the bottom of the body of water in which the article has been dropped, the float will rise to the water surface marking the place where the object comes to rest at the bottom of the body of water, thereby rendering it a simple matter to retrieve the article.

Having thus described the invention, what is claimed is:

A sunken object indicator comprising a container formed of a cylindrical side wall and a bottom wall, said side wall having openings, a buoyant closure in the upper open end of said container, a flexible cord coiled within said container, means securing one end of said cord to said container, means securing the other end of said cord to said closure, a gas operating pellet in said container, a water soluble band about the exterior of said container and normally closing said openings, dissolving of said band permitting entrance of water in said container whereby said pellet will generate gas and thereby force said closure from said container, and an apertured ear extending from one end of said container whereby said container may be anchored to a support.

References Cited in the file of this patent
UNITED STATES PATENTS

| 1,476,387 | Atwell | Dec. 4, 1923 |
| 2,479,021 | Perkins | Aug. 16, 1949 |
| 2,528,799 | Strong | Nov. 7, 1950 |
| 2,642,693 | Broady | June 23, 1953 |